United States Patent
Hammack et al.

(10) Patent No.: US 11,340,073 B2
(45) Date of Patent: May 24, 2022

(54) POSITIONING CORRECTION

(71) Applicant: LIVING MAP LIMITED, Bath (GB)

(72) Inventors: James Hammack, Huntsville, AL (US); Perry Wischow, Fort Collins, CO (US); Gary McKay, East Sussex (GB); Tim Fendley, Bathford (GB)

(73) Assignee: LIVING MAP LIMITED, Bath (GB)

( * ) Notice: Subject to any disclaimer, the term of this patent is extended or adjusted under 35 U.S.C. 154(b) by 163 days.

(21) Appl. No.: 16/961,765

(22) PCT Filed: Nov. 13, 2018

(86) PCT No.: PCT/GB2018/053289
§ 371 (c)(1),
(2) Date: Jul. 13, 2020

(87) PCT Pub. No.: WO2019/092460
PCT Pub. Date: May 16, 2019

(65) Prior Publication Data
US 2021/0048298 A1    Feb. 18, 2021

Related U.S. Application Data

(60) Provisional application No. 62/585,213, filed on Nov. 13, 2017.

(51) Int. Cl.
*G01C 21/16* (2006.01)
*G01C 21/20* (2006.01)
*G01S 19/49* (2010.01)

(52) U.S. Cl.
CPC ......... *G01C 21/165* (2013.01); *G01C 21/206* (2013.01); *G01S 19/49* (2013.01)

(58) Field of Classification Search
None
See application file for complete search history.

(56) References Cited

U.S. PATENT DOCUMENTS 6,317,683 B1 * 11/2001 Ciprian ............... G01C 21/30
                                                                701/118
9,661,473 B1    5/2017 Jarvis et al.
(Continued)

FOREIGN PATENT DOCUMENTS

EP         2224209 A2 *  9/2010  ............. G01S 19/49
KR     20160094021 A  *  8/2016
KR     1020160094021 A    8/2016

OTHER PUBLICATIONS

PCT International Search Report and Written Opinion for Application No. PCT/GB2018/053289 dated Feb. 20, 2019, 14 pages.
(Continued)

*Primary Examiner* — Khoi H Tran
*Assistant Examiner* — Tristan J Greiner
(74) *Attorney, Agent, or Firm* — Finch & Maloney PLLC (57) ABSTRACT

A method for determining an estimated position of a device within a location, the device comprising at least one movement sensor configured to generate sensor data, and the device storing a map of the location, the map being divided into a plurality of regions, the method comprising: calculating an estimated position for the device within the location based on the sensor data; determining an estimated region of the plurality of regions for the device based on the estimated position; calculating an estimated heading for the device based on the sensor data; comparing the estimated heading to a most-likely heading associated with the estimated region to generate a difference between the two headings; and setting the estimated heading to the most-likely heading associated with the estimated region if difference between the two headings is greater than a threshold heading difference.

20 Claims, 3 Drawing Sheets

(56) References Cited

U.S. PATENT DOCUMENTS

| | | | |
|---|---|---|---|
| 2008/0208455 A1* | 8/2008 | Hartman | G05D 1/0231 |
| | | | 701/408 |
| 2010/0217522 A1* | 8/2010 | Ando | G01C 21/30 |
| | | | 701/532 |
| 2012/0203453 A1 | 8/2012 | Lundquist et al. | |
| 2013/0261856 A1* | 10/2013 | Sharma | B61L 25/025 |
| | | | 701/19 |
| 2014/0129175 A1 | 5/2014 | Poduri et al. | |
| 2014/0172293 A1 | 6/2014 | Chang et al. | |
| 2014/0236482 A1* | 8/2014 | Dorum | G01C 21/34 |
| | | | 701/533 |
| 2014/0274151 A1 | 9/2014 | Pattabiraman et al. | |
| 2016/0195391 A1 | 7/2016 | Young et al. | |
| 2016/0360380 A1 | 12/2016 | Huang et al. | |
| 2019/0186927 A1* | 6/2019 | Koponen | G01C 21/30 |
| 2019/0212164 A1* | 7/2019 | Loebbert | G01C 21/3632 |
| 2019/0346848 A1* | 11/2019 | Zhou | G05D 1/0278 |
| 2020/0257301 A1* | 8/2020 | Weiser | G01C 21/3407 |

OTHER PUBLICATIONS

Great Britain Search Report for Application No. GB 1802074.3 dated Jul. 23, 2018, 5 pages.

* cited by examiner

FIG. 3

POSITIONING CORRECTION

RELATED APPLICATIONS

This application is a National Phase Application which claims priority under 35 U.S.C. § 371 to International Application No. PCT/GB2018/053289 filed Nov. 13, 2018 and titled "POSITIONING CORRECTION", which claims priority to U.S. Provisional Application No. 62/585,213 filed Nov. 13, 2017 and titled "POSITIONING CORRECTION," each of which is hereby incorporated herein by reference in its entirety.

This invention relates to a method and device for correcting an estimated position of the device.

It is becoming increasingly common for devices to be able to determine their position within an environment. There are a number of ways in which devices can determine their position within an environment. Some commonly used ones are: global navigation satellite systems; range from a radio transmitter such as: a Wi-Fi beacon, a cellular network base station, and/or a Bluetooth transmitter; a compass; a gyroscope, accelerometer; magnetometer; and/or a barometer.

In some environments, it is relatively straightforward to obtain an accurate position for the device within the environment. For instance, in an outdoor environment with no obstructions of the sky a global navigation satellite system can provide a relatively accurate estimate of a device's position.

In other environments, it can be more difficult to obtain an accurate position for the device within the environment. For instance, in an indoor environment the signals from global navigation satellite systems may not be able to be received by the device. This therefore makes it difficult to estimate the position of a device in an environment where positioning signals transmitted by external sources cannot be received or are received intermittently.

It is therefore desirable for there to be an improved method of determining the location of a device in environments where there is intermittent or no access to external transmitted positioning sources.

According to a first aspect of the present invention there is provided a method for determining an estimated position of a device within a location, the device comprising at least one movement sensor configured to generate sensor data, and the device storing a map of the location, the map being divided into a plurality of regions, the method comprising: calculating an estimated position for the device within the location based on the sensor data; determining an estimated region of the plurality of regions for the device based on the estimated position; calculating an estimated heading for the device based on the sensor data; comparing the estimated heading to a most likely heading associated with the estimated region to generate a difference between the two headings; and setting the estimated heading to the most-likely heading associated with the estimated region if difference between the two headings is greater than a threshold heading difference.

The method may comprise setting the most-likely heading to the reciprocal of the most-likely heading if the difference between the two headings is greater than 90 degrees. The method may comprise setting the estimated heading to the reciprocal of the most-likely heading associated with the estimated region if difference between the two headings is greater than a threshold heading difference. The device may store a respective most-likely heading against at least one of the regions. The method may comprise calculating an estimated position for the device within the location based on the sensor data and an earlier estimated position calculated using external wireless signals.

The method may comprise: determining an access status for the estimated region, the access status indicating whether a device can be located in the estimated region; and if the access status indicates that the device cannot be located in the estimated region, setting the estimated region to a most-likely alternative region associated with the estimated region; wherein the comparing the estimated heading and setting the estimated heading are performed against the most-likely alternative region that has been set as the estimated region. The device may store an access status against at least one of the regions. The device may store an access status against each of the regions. The device may store a most-likely alternative region against regions that have an access status that indicates that the device cannot be located in that region. The sensor data may be generated by at least one of a digital compass, an accelerometer, a gryometer, and a magnetometer. The regions may be of equal size. The regions may be of same shape.

According to a second aspect of the present invention there is, provided a device being configured to determine an estimated position of the device within a location, the device comprising at least one movement sensor configured to generate sensor data, and the device storing a map of the location, the map being divided into a plurality of regions, the device being configured to: calculate an estimated position for the device within the location based on the sensor data; determine an estimated region of the plurality of regions for the device based on the estimated position; calculate an estimated heading for the device based on the sensor data; compare the estimated heading to a most-likely heading associated with the estimated region to generate a difference between the two headings, and set the estimated heading to the most-likely heading associated with the estimated region if difference between the two headings is greater than a threshold heading difference.

The device may be configured to set the most-likely heading to the reciprocal of the most-likely heading if the difference between the two headings is greater than 90 degrees. The device may be configured to set the estimated heading to the reciprocal of the most-likely heading associated with the estimated region if difference between the two headings is greater than a threshold heading difference. The device may store a respective most-likely heading against at least one of the regions. The device may be configured to calculate an estimated position for the device within the location based on the sensor data and an earlier estimated position calculated using external wireless signals. The device may be configured to: determine an access status for the estimated region, the access status indicating whether a device can be located in the estimated region; and if the access status indicates that the device cannot be located in the estimated region, set the estimated region to a most-likely alternative region associated with the estimated region; wherein comparing the estimated heading and setting the estimated heading are performed against the most-likely alternative region that has been set as the estimated region. The device may store an access status against at least one of the regions. The device may store an access status against each of the regions. The device may store a most-likely alternative region against regions that have an access status that indicates that the device cannot be located in that region. The sensor data may be generated by at least one of a digital compass, an accelerometer, a gyrometer, and a magnetometer. The regions may be of equal size. The regions may be of same shape.

The present invention will now be described by way of example with reference to the accompanying drawings. In the drawings.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a method for determining an estimated position of a device within a location, the device comprising at least one movement sensor configured to generate sensor data, and the device storing a map of the location, the map being divided into a plurality of regions. The method comprises: calculating an estimated position for the device within the location based on the sensor data. The method may comprise calculating the estimated position for the device without receiving current location data from external wireless signals. The method further comprises determining an estimated region of the plurality of regions for the device based on the estimated position, calculating an estimated heading for the device based on the sensor data; comparing the estimated heading to a most-likely heading associated with the estimated region to generate a difference between the two headings; and setting the estimated heading to the most-likely heading associated with the estimated region if difference between the two headings is greater than a threshold heading difference.

Figure 1:
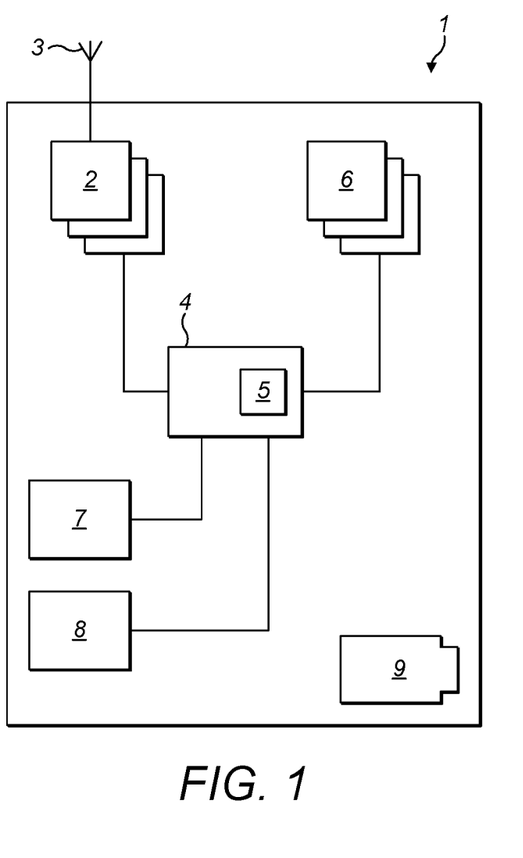
FIG. 1 shows a mobile device that can determine its location.

FIG. 1 shows a schematic diagram of an example mobile device 1. The mobile device 1 comprises at least one wireless communication unit 2. In FIG. 1, three wireless communication units 2 are shown but it will be appreciated that any number of wireless communication units 2 may be present in the device depending on the types of wireless signals that the mobile device 1 is configured to receive and/or transmit. These wireless communication units 2 may be connected to at least one antenna 3. Each wireless communication unit 2 may be connected to its own antenna or alternatively some or all of the wireless communication units 2 may share antenna(s).

The mobile device 1 comprises a processor 4 and a non-volatile memory 5. The mobile device 1 may comprise more than one processor 4 and more than one memory 5. The memory 5 stores a set of program instructions that are executable by the processor, and reference data such as look-up tables that can be referenced by the processor in response to those instructions. The processor 4 may be configured to operate, in accordance with a computer program stored in non-transitory form on a machine-readable storage medium. The computer program may store instructions for causing the processor to perform the methods described herein.

The processor 4 may be connected to the wireless communication unit(s) 2 to permit communication between them. The processor 4 may use at least one wireless communication unit to send and/or receive data over a wireless communication network. For instance, the wireless communication unit(s) 2 may be:

- A cellular communication unit configured to send and receive data over a cellular communication network. The cellular communication unit may be configured to communicate with cellular base stations to send and receive data.
- A Wi-Fi communication unit configured to send and receive data over a wireless communication network such as a Wi-Fi network. The Wi-Fi communication unit may be configured to communicate with wireless base stations to send and receive data.
- A Bluetooth communication unit configured to send and receive data over a Bluetooth communication network. The Bluetooth communication network may be configured to communicate with other Bluetooth devices to send and receive data
- A global navigation satellite system communication unit configured to receive data from at least one satellite that emits a positioning signal. The global navigation satellite system that the satellites are part of may be any satellite navigation system such as GPS, GLONASS, Galileo or a combination of systems.

It will be appreciated that the wireless communication unit(s) may be configured to communicate using other wireless protocols.

One or more of the wireless communication units 2 may be part of processor 4. Part or all of a wireless communication unit's function may be implemented by processor 4 by processor running software to process signals received by an antenna 3.

The mobile device 1 may use some or all of the wireless communication units 2 to calculate the location of the device 1. The location of the device 1 may be a point within an environment or it may be an area within the environment depending on the accuracy to which the location of the device 1 can be calculated based on the location information received or calculated by data received from the wireless communication units 2. This processing and calculation may be undertaken by processor 4 or by a dedicated processor for calculating the location of the device.

The mobile device 1 may receive location information from one or more satellites and calculate a location of the device 1 using that location information. The location calculated using such satellites is likely to be reasonably accurate if signals have been received from a large enough number of satellites. This number is usually a minimum of four satellites.

The mobile device 1 may also calculate location information from data received by one or more communication units. This location information may be calculated by determining which base station the communication unit is communicating with. The location of those base stations is known and the reception strength of communications received from that base station can be calculated. Therefore, the range from the base station can be determined to provide an area in, which, the device 1 may be located. The communication unit may also receive data from base stations that, whilst the communication unit is not actively communicating with, are within the reception range of the communication, unit. The mobile device 1 may be able to identify those base stations that are within range and look up their positions. The reception of transmissions from these base stations and potentially the strength of those signals can be used to calculate location information about the device 1 that can be used to calculate a location of the device 1.

The device 1 may calculate its current location using location information derived from multiple sources. For example, the mobile device 1 may use location information received from one or more navigation satellites together with location information derived from communications with one or more base stations.

The above described ways of deriving the current location of the mobile device 1 involve using at least one external positioning system. The mobile device 1 may also be configured to determine its current location using location information received from at least one movement sensor 6. The movement sensor(s) 6 may be configured to detect movement of the device without relying on external wireless signals for the detection of the motion. The external wireless signals are signals that are received from outside of the mobile device. The movement sensor(s) 6 can calculate a relative movement of the device over a period of time. For instance, the movement sensor(s) 6 may generate a direction that the device has moved in between a first time and a second time; and/or the movement sensor(s) 6 may generate a distance that the device has moved in between a first time and a second time.

These movement sensor(s) 6 may be connected to processor 4 to enable communication between the processor 4 and movement sensor(s) 6. The movement sensor(s) 6 may be:

A digital compass which calculates the direction that the device is pointed in relative to the magnetic field of the Earth. A digital compass is therefore configured to, provide the direction that the device 1 is orientated.

An accelerometer. The accelerometer may calculate the acceleration rate that the device 1 is being moved in a direction. The accelerometer may output time series data of acceleration readings in the direction that the accelerometer gathers data. The device may comprise more than one accelerometer. The accelerometers may be orientated so as to gather acceleration readings in different directions. The accelerometers may gather acceleration readings in orthogonal directions.

A gyrometer. The gyrometer may output data that can be used to calculate the orientation of the device relative to a horizontal plane. The gyrometer may output data that can be used to calculate the direction of movement of the device between a first time and a second time. The gyrometer may output time series data of direction readings A magnetometer. The magnetometer may sense changes in the local magnetic field of the Earth. This can be used to derive data concerning the movement of the device 1 relative to the surface of the Earth. The magnetometer may be a hall effect sensor that detects the magnetic field of the Earth.

The mobile device 1 may also comprise a display 7. The mobile device 1 may be configured to display information on the display. The mobile device 1 may be configured to display a map of the current location of the device 1 on the display. The current location of the device 1 may be indicated, on the map that is displayed on the display 7. The mobile device 1 may also comprise a user interface 8. The user interface 8 may be configured to permit a user of the device to interact with the device 1. The user interface 8 may at least in part be formed as part of display 7. For instance, the display 7 may be a touch screen and display buttons and other interactive features on the display that the user can interact with by touching the touch screen.

The mobile device 1 may comprise a power source 9 such as a battery. The mobile device 1 may accept, an external power supply to enable the power source 9 to be charged.

The mobile device 1 may be configured to determine its current location in first situations when it can receive external wireless signals that can be used to calculate location information to derive the current location of the device and in second situations when it cannot receive external wireless signals that can be used to calculate location information and relies on motion sensors to derive the current location of the device. In built-up environments and/or indoor environments it is likely that there will be periods of time where the device switches between being in the first situations and being in the second situations. When this transition occurs from a first mode of operation, where the device can calculate its position using external signals, to a second mode of operation, where the device needs to calculate its position using internal sensors, the device can use the last known location calculated in the first mode of operation and use this as a starting point for calculating an updated position whilst operating in the second mode. As described herein, the internal sensors can individually, and even in combination, have a level of error and/or drift that renders the updated location that they can be used to calculate inaccurate over a reasonable time period. Therefore, the mobile device 1 may calculate the updated location based on the internal sensors using the method described herein with reference to FIGS. 2 and 3.

Figure 2:
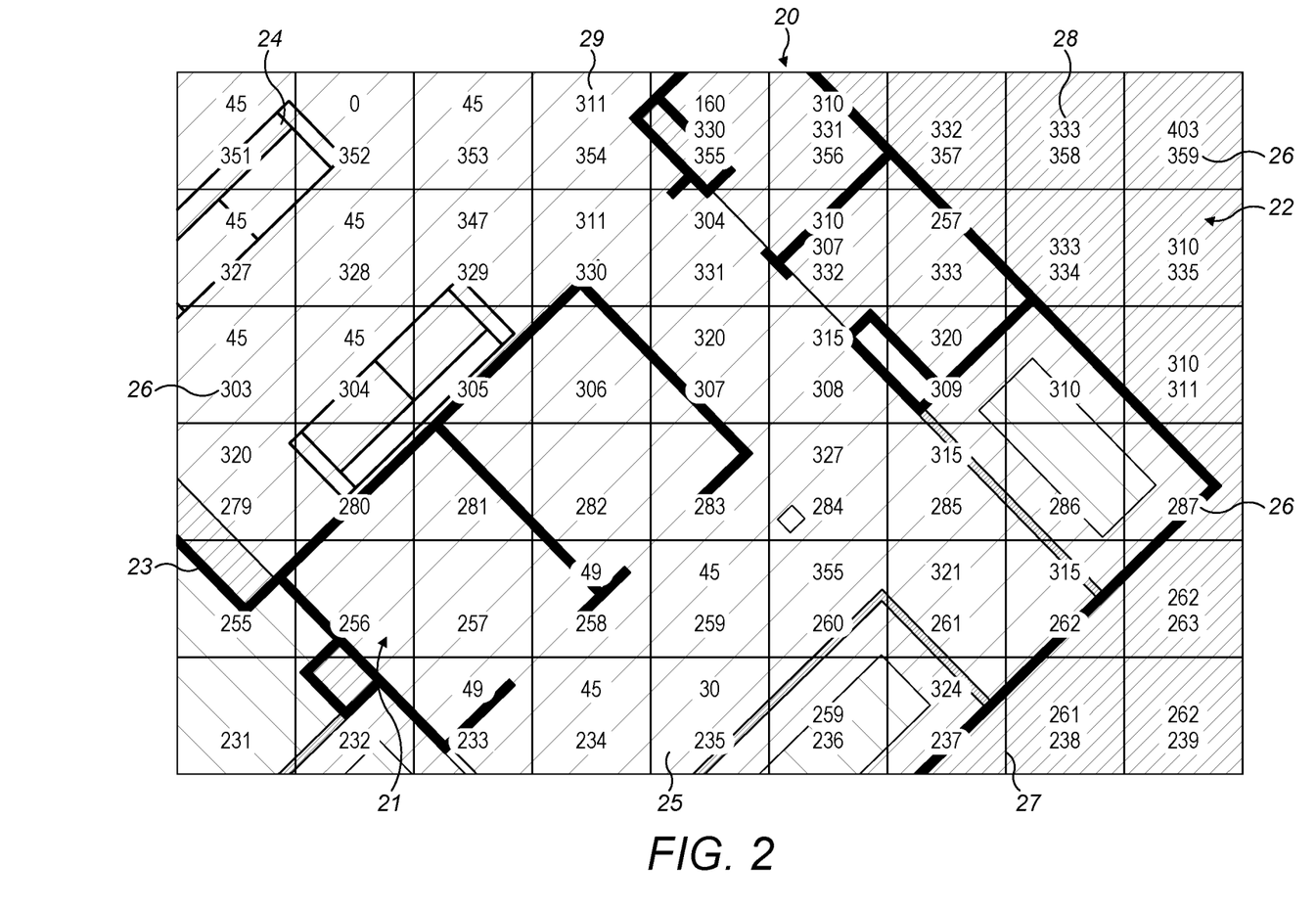
FIG. 2 shows a map of a location that is divided into regions.

The mobile device 1 stores a map of the current location in memory 5. This map may be an indoor location or a location with a built-up environment. It could equally also be a more open location but where the reception of external wireless signals for location purposes is undesirable. A portion of an example map 20 is shown in FIG. 2. The map shows the layout of an indoor location. The location, and thus the map, comprises areas where people can move through as indicated as an example by arrow 21. The location, and thus the map, also comprises areas where people cannot travel to. An example of this is shown by arrow 22. These areas may typically be voids within a building, outside of the building or have other characteristics which mean that people cannot transit to those regions. The location, and thus the map, may also contain items through which people cannot pass. Such items may be walls 23. The map may also show items that are contained within the location, such as sofas 24.

As shown in FIG. 2, the map is divided into a plurality of regions 25. Each of these regions 25 is assigned a region identifier 26 that is unique to that region 25. The region boundaries and region identifiers 26 are shown in FIG. 2 but it will be understood would not be displayed on a map of the location. The map may be divided up into the regions in a grid 27. The grid may have two orthogonal axes that cuts the map into the regions. The regions may all be equally sized. The regions may all be the same shape. As shown in FIG. 2, the regions may be squares and all of the same size. The map may be divided into many rows and columns of grid cells. Whilst the regions have been pictured as being squares, other shapes may be used depending on the topology of the map. For instance, a hexagonal grid may be used. The orientation of the axes of the grid may be selected to best match the features of the map. I.e. to best match the walls of the location.

The mobile device 1 can calculate its position using the external wireless signals and/or internal sensors. The mobile device 1 can then determine which region that position indicates that the mobile device 1 is in. This is important because each region can contain additional information which can assist the mobile device 1 in more accurately determining its actual position based on the position information derived from the external wireless signals and/or internal sensors. Each region may comprise an access status which indicates whether a user (and hence a device) can access that region. If the access status indicates that a user can access that region (i.e. by walking into it) then a device checking the access status for that region, after determining that the device's location indicates it is in that, region, has another piece of information to confirm whether the device's calculated location is correct. An access status that indicates that a user can access the region may be a positive access status. Likewise, if the access status indicates that a user cannot access that region (i.e. because it is a void in the building) then the device has an indication that the device location calculated by the device is incorrect. An access status that indicates that a user cannot access the region may be a negative access status.

The access status on its own is of limited use to a device in assisting in calculating a more accurate position for the device. If the access status indicates that a device should not be located in a particular region then the device ideally needs additional information to correct the calculated position of the device so one that is more accurate. Thus, each of the regions may have additional information associated with them depending on whether the region is one in which a user is able to access or not.

If the region is one that has an access status that indicates a device cannot be present in that region, the region may also have a most-likely alternative region 28 associated with it. The most-likely alternative region 28 indicates which region the device is likely to actually be located in if the device's region is calculated to be one with an access status of negative. If the device calculates that its position is located in a region with an access status of negative, then the device may update its position to be the most-likely alternative region 28 associated with the calculated region. Thus, this can increase the accuracy of the position calculation of the device especially when the device is calculating its position using internal sensors only without reference to external wireless signals. This is because there can be a larger error when using only internal sensors, or with limited external wireless signals.

It can also be useful to have more information about the direction in which a device is travelling. When there are external wireless signals available, this may be easy to calculate because the device's position can be calculated relatively accurately and so it is easy to determine with relatively high accuracy the direction in which a device is travelling. However, when the device is calculating its position using limited external wireless signals or only using internal sensors then the travel direction can be harder to determine because the larger errors in the calculated position mean that the device's calculated position can fluctuate greatly. These fluctuations can confuse a calculation of the movement direction of the device. Therefore, it can be useful to know what the most likely direction of movement will be from a given region. This is shown in FIG. 2 by the most-likely heading 29. The most-likely heading 29 indicates the heading in which it is likely that a device will travel when exiting the current region. The most-likely heading 29 may indicate a line along which a device may transit and so the device may transit in either direction along that line. Therefore, whilst the most-likely heading 29 may point in one direction it may be determined that the mobile device is actually travelling in the opposite direction but along the same line. The most-likely heading 29 may be stored with reference to another of the regions. The most-likely heading 29 may store the unique region identifier 26 of another region which most accurately indicates the line along which the device may transit. Thus, the most-likely heading 29 may be a neighbouring region or may be a more distant region if that region more accurately indicates the transit direction.

The most-likely heading 29 can assist in improving the accuracy of the position estimates of the device. This is because the next position calculation can use the most-likely heading 29 to select which region the device has transited in to. This provides an additional source of data over the internal sensors that the device relies on when there are no external wireless signals to use for positioning.

Figure 3:
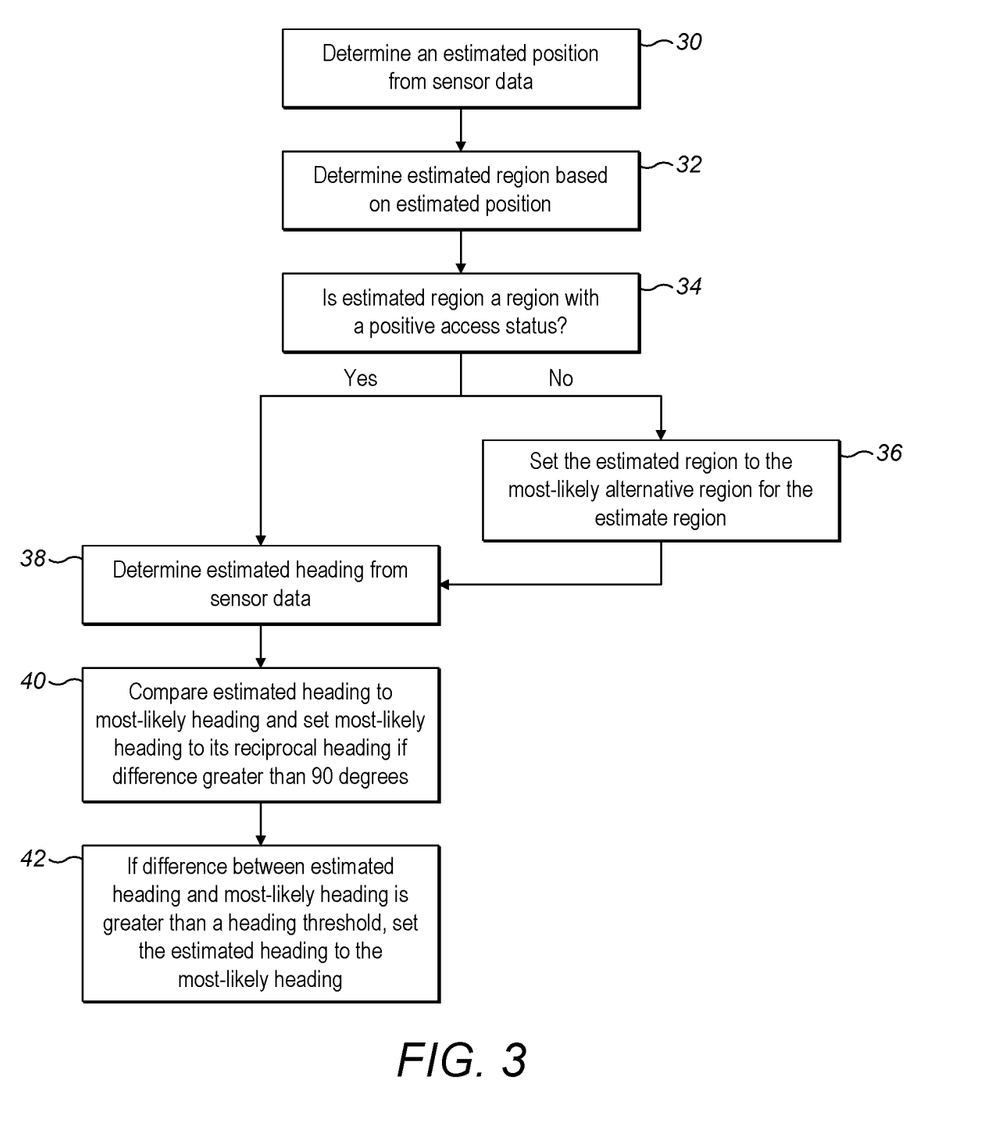
FIG. 3 shows a flow chart of a method of determining the position and heading of a device.

The use of the data associated with the regions will now be described in more detail with reference to FIG. 3. FIG. 3 shows a flow chart of a method for updating, an estimated position of a device based on the data associated with the regions of a location.

As shown in step 30, the device determines an estimated position from sensor data. This sensor data may be generated by one or more movement sensor 6. The device may use the sensor data together with an earlier position calculated using external wireless signals to generate the current estimated position for the device. Thus, the device can use a potentially more accurate earlier position together with the sensor data to derive the current estimated position of the device.

As shown in step 32, the device determines an estimated region based on the estimated position. The estimated region being one of the regions that the location has been divided up into.

As shown in step 34, the device determines whether the estimated region is one that has a positive or negative access status. The device determines whether the access status of the estimated region indicates that a device can be present in the estimated region or cannot be present in the estimated region.

If the estimated region has an access status that means a device cannot be present in the estimated region, then the estimated region is updated based on the most-likely alternative region for the estimated region. This is as shown in step 36. Thus, in the case that the estimated region has an access status that means the device cannot be present in that region, the estimated region has a most-likely alternative region associated with it. The device assumes that the most-likely alternative region is the actual region that the device is located in.

In the case that the estimated region has an access status that means a device can be present in the estimated region, then as shown in step 38 the device determines the estimated heading of the device based on the sensor data. In addition, in the case that the estimated region has an access status that means a device cannot be present in the estimated region and has had its estimated region updated to the most-likely alternative region, then the device again can proceed to step 38 and determine the estimated heading of the device based on the sensor data. It will be appreciated that the step of estimating the heading may occur before the determination of the access status of the estimated region.

As shown in step 40, the device compares the estimated heading to the most-likely heading associated with the estimated region. It is likely in most regions that there are two most-likely headings that the device could take. These most-likely headings may be the reciprocal of each other. I.e. point in opposite directions. This would especially be the case where the region is a corridor in the location or an entrance to a room. Thus, the device compares the estimated heading to the most-likely heading and if the difference between the two is greater than 90 degrees then the most-likely heading is set to its reciprocal. This is done as it is likely that the device is travelling the opposite direction to the most-likely heading that is stored against the region.

As shown in step 42, the device sets the estimated heading to the most-likely heading if the difference between the estimated heading and the most-likely heading is greater than a threshold amount. The threshold amount may be 5 degrees, 10 degrees, 15 degrees, 20 degrees, or 25 degrees. The threshold amount may be as high as 45 degrees.

Thus, the device now potentially has at least one of an updated estimated position based on the estimated region and an updated estimated heading. These updated positions and headings are likely to be more accurate than just relying on the movement sensor data alone.

The device can compute the distance between the original estimated, position and the updated estimated position. This distance can be used to update the calculations of the movement sensors to correct for the errors that have been introduced in to their sensing. The device may calculate sensor error correction values that can be used to modulate the output(s) of the sensor(s) in future rounds of calculation.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for determining an estimated position of a device within a location, the device comprising at least one movement sensor configured to generate sensor data, and the device storing a map of the location, the map being divided into a plurality of regions, the method comprising:
   calculating an estimated position for the device within the location based on the sensor data;
   determining an estimated region of the plurality of regions for the device based on the estimated position;
   calculating an estimated heading for the device based on the sensor data;
   comparing the estimated heading to a most-likely heading associated with the estimated region to generate a difference between the two headings; and
   setting the estimated heading to the most-likely heading associated with the estimated region if difference between the two headings is greater than a threshold heading difference.

2. The method according to claim 1, the method comprising setting the most-likely heading to a reciprocal of the most-likely heading if the difference between the two headings is greater than 90 degrees.

3. The method according to claim 2, the method comprising setting the estimated heading to a reciprocal of the most-likely heading associated with the estimated region if difference between the two headings is greater than a threshold heading difference.

4. The method according to claim 1, wherein the device stores a respective most-likely heading against at least one of the regions.

5. The method according to claim 1, the method comprising calculating an estimated position for the device within the location based on the sensor data and an earlier estimated position calculated using external wireless signals.

6. The method according to claim 1, the method comprising:
   determining an access status for the estimated region, the access status indicating whether a device can be located in the estimated region; and
   if the access status indicates that the device cannot be located in the estimated region, setting the estimated region to a most-likely alternative region associated with the estimated region;
   wherein the comparing the estimated heading and setting the estimated heading are performed against the most-likely alternative region that has been set as the estimated region.

7. The method according to claim 1, wherein the device stores an access status against at least one of the regions.

8. The method according to claim 7, wherein the device stores a most-likely alternative region against regions that have an access status that indicates that the device cannot be located in that region.

9. The method according to claim 1, the sensor data being generated by at least one of a digital compass, an accelerometer, a gryometer, and a magnetometer.

10. The method according to claim 1, wherein the regions are of equal size and/or the regions are of a same shape.

11. A device being configured to determine an estimated position of the device within a location, the device comprising at least one movement sensor configured to generate sensor data, and the device storing a map of the location, the map being divided into a plurality of regions, the device being configured to:
    calculate an estimated position for the device within the location based on the sensor data;
    determine an estimated region of the plurality of regions for the device based on the estimated position;
    calculate an estimated heading for the device based on the sensor data;
    compare the estimated heading to a most-likely heading associated with the estimated region to generate a difference between the two headings; and
    set the estimated heading to the most-likely heading associated with the estimated region if difference between the two headings is greater than a threshold heading difference.

12. The device according to claim 11, the device being configured to set the most-likely heading to a reciprocal of the most-likely heading if the difference between the two headings is greater than 90 degrees.

13. The device according to claim 12, the device being configured to set the estimated heading to a reciprocal of the most-likely heading associated with the estimated region if difference between the two headings is greater than a threshold heading difference.

14. The device according to claim 11, wherein the device stores a respective most-likely heading against at least one of the regions.

15. The device according to claim 11, the device being configured to calculate an estimated position for the device within the location based on the sensor data and an earlier estimated position calculated using external wireless signals.

16. The device according to claim 11, the device being configured to:
- determine an access status for the estimated region, the access status indicating whether a device can be located in the estimated region; and
- if the access status indicates that the device cannot be located in the estimated region, set the estimated region to a most-likely alternative region associated with the estimated region;
- wherein comparing the estimated heading and setting the estimated heading are performed against the most-likely alternative region that has been set as the estimated region.

17. The device according to claim 11, wherein the device stores an access status against at least one of the regions.

18. The device according to claim 17, wherein the device stores a most-likely alternative region against regions that have an access status that indicates that the device cannot be located in that region.

19. The device according to claim 11, the sensor data being generated by at least one of a digital compass, an accelerometer, a gyrometer, and a magnetometer.

20. The device according to claim 11, wherein the regions are of equal size and/or the regions are of a same shape.

* * * * *